United States Patent
Huang (10) Patent No.: US 8,447,611 B2
(45) Date of Patent: May 21, 2013

(54) PEN-TYPE VOICE COMPUTER AND METHOD THEREOF

(75) Inventor: Yen-Son Paul Huang, Cupertino, CA (US)

(73) Assignee: Fortemedia, Inc., Sunnyvale, CA (US)

( * ) Notice: Subject to any disclaimer, the term of this patent is extended or adjusted under 35 U.S.C. 154(b) by 1223 days.

(21) Appl. No.: 11/516,140

(22) Filed: Sep. 5, 2006

(65) Prior Publication Data
US 2008/0059196 A1    Mar. 6, 2008

(51) Int. Cl.
*G10L 21/00*    (2006.01)

(52) U.S. Cl.
USPC ............................... 704/270; 704/231

(58) Field of Classification Search
USPC ................................. 704/270, 231
See application file for complete search history.

(56) References Cited

U.S. PATENT DOCUMENTS

| | | | |
|---|---|---|---|
| 6,249,765 B1 | 6/2001 | Adler et al. | |
| 6,438,523 B1 * | 8/2002 | Oberteuffer et al. | 704/270 |
| 6,505,153 B1 * | 1/2003 | Van Thong et al. | 704/211 |
| 7,225,131 B1 * | 5/2007 | Bangalore et al. | 704/270 |
| 2002/0152075 A1 * | 10/2002 | Kung et al. | 704/270 |
| 2004/0071344 A1 * | 4/2004 | Lui et al. | 382/181 |
| 2004/0193428 A1 * | 9/2004 | Fruchter et al. | 704/276 |
| 2004/0215458 A1 | 10/2004 | Kobayashi et al. | |
| 2005/0102138 A1 * | 5/2005 | Mao | 704/231 |
| 2005/0128181 A1 * | 6/2005 | Wang et al. | 345/156 |
| 2005/0137867 A1 * | 6/2005 | Miller | 704/252 |
| 2005/0159948 A1 * | 7/2005 | Roth et al. | 704/233 |
| 2006/0195510 A1 | 8/2006 | McNally | |

OTHER PUBLICATIONS

Schimke et al., "Integration and Fusion Aspects of Speech and Handwriting Media", SPECOME'2004, 9th Conference Speech and Computer, Sep. 22-24, 2004, 5 pages, ISCA Archive, Russia.

* cited by examiner

*Primary Examiner* — Douglas Godbold (57) ABSTRACT

A pen-type voice computer generating a voice index table and the method thereof. The method comprises recording voice data by a microphone, generating a handwriting index of the voice data by inputting drawing data using a handwriting input device, and associating the handwriting index with the corresponding voice data to generate the voice index table.

8 Claims, 6 Drawing Sheets

| Handwriting index field 500 | Text index field 502 | Voice index field 506 | Application index field 508 |
|---|---|---|---|
| Handwriting index 5001 | Text index 5021 | Voice index 5061 | Application index 5081 |
| Handwriting index 5002 | Text index 5022 | Voice index 5062 | Application index 5082 |
| " | " | " | " |
| Handwriting index 500N | Text index 502N | Voice index 506N | Application index 508N |

FIG. 3 voice stream

INTRODUCTION
According to the well-known story, it was on seeing an apple fall in his orchard at some time during 1665 or 1666 that Newton conceived that the same force governed the motion of the Moon and the apple. He calculated the force needed to hold the Moon in its orbit, as compared with the force pulling an object to the ground. He also calculated the centripetal force needed to hold a stone in a sling, and the relation between the length of a pendulum and the time of its swing. These early explorations were not soon exploited by Newton through he studied astronomy and the problems of planetary motion.

Correspondence with Hooke (1679-1680) redirected Newton to the problem of the path of a body subjected to a centrally directed force that varies as the inverse square of the distance; he determined it to be an ellipse, so informing Edmond Halley in August 1684. Halley's interest led Newton to demonstrate the relationship afresh to compose a brief tract on mechanics, and finally to write the Principia.

Book I of the Principia states the foundations of the science of mechanics, developing upon them the mathematics of orbital motion round centres of force. Newton identified gravitation as the fundamental force controlling the motions of the celestial bodies. He never found its cause. To contemporaries who found the idea of attractions across empty space unintelligible, he conceded that they might prove to be caused by the impacts of unseen particles.

Book II inaugurates the theory of fluids: Newton solves problems of fluids in movement and of motion through fluids. From the density of air he calculated the speed of sound waves.

Book III shows the law of gravitation at work in the universe: Newton demonstrates it from the revolutions of the six known planets, including the Earth, and their satellites. However, he could never quite perfect the difficult theory of the Moon's motion. Comets were shown to obey the same law; in later editions, Newton added conjectures on the possibility of their return. He calculated the relative masses of heavenly bodies form the gravitational forces, and the oblateness of Earth and Jupiter, already observed. He explained tidal ebb and flow and the precession of the equinoxes from the forces exerted by the Sun and Moon. All this was done by exact computation.

Newton's work in mechanics was accepted at once in Britain, and universally after half a century. Since then it has been ranked among humanity's greatest achievements in abstract though. It was extended and perfected by others, notably Pierre Simon de Laplace, without changing its basis and it survived into the late 19$^{th}$ century before it

| Handwriting index field 500 | Text index field 502 | Voice index field 506 | Application index field 508 |
|---|---|---|---|
| Handwriting index 5001 | Text index 5021 | Voice index 5061 | Application index 5081 |
| Handwriting index 5002 | Text index 5022 | Voice index 5062 | Application index 5082 |
| = | = | = | = |
| Handwriting index 500N | Text index 502N | Voice index 506N | Application index 508N |

FIG. 5

PEN-TYPE VOICE COMPUTER AND METHOD THEREOF

BACKGROUND OF THE INVENTION

1. Field of the Invention

The invention relates to a pen-type voice computer, and in particular to data indexing of a pen-type voice computer.

2. Description of the Related Art

Conventionally, students employ a pan to take class notes, while using a voice recorder to tape a class. Similarly, reporters or journalists take handwriting notes and voice record in an interview.

However, voice data require considerable memory capacity for storage. Also the conventional approach has the difficulty for searching a particular piece of voice data. The user has to find the desirable data piece by blind searching the complete voice data, consuming unnecessary time and efforts.

There is a need for a means capable of searching recorded data easily, and a method and device of generating a search index and performing a index search is disclosed in the invention.

BRIEF SUMMARY OF THE INVENTION

A detailed description is given in the following embodiments with reference to the accompanying drawings.

The characteristic of the pen-type voice computer comprises:

- two inputs—Pen writing and Microphones, one output—speaker/earpiece speaker
- Three I/O can operated concurrently.
- A built in Hand Writing Recognition for Pen writing, a built-in voice recognition for speech, and text to speech (TTS) so that server to pen-type voice computer will be data instead of voice.
- Construct into 2 pieces—Pen and Voice interface (Microphones+Speaker/earpiece).
- Voice Interface portion is a headset.
- Through wireless it can access Network, Servers, Big Speaker, Big Keyboard, and Display.
- Pen writing and voice recording are taken concurrently, last segment of pen writing can be associated to voice stream.
- The last segment become index (text) after recognized by writing recognition.
- The associated segment of voice stream can become index (text) by voice recognition.
- Index can be used to search and replay in voice recording.
- The voice stream can be communicated with Server by more text than speech.
- One button can be used to indicate insert the concatenated text string can be input.
- Pen writing, voice recording and Speaker/earpiece can be operated concurrently.
- The writing become text by writing recognition.
- The voice become text by voice recognition.
- Speaker/earpiece continuously speak out the texts from writing and recording by Text to Speech Program.

BRIEF DESCRIPTION OF THE DRAWINGS

The invention can be more fully understood by reading the subsequent detailed description and examples with references made to the accompanying drawings, wherein:

FIGS. 4a and 4b illustrate an exemplary method of index generation, incorporating the pen-type voice computer in FIG. 1, the flow diagram in FIG. 2, and the lookup table in FIG. 3.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
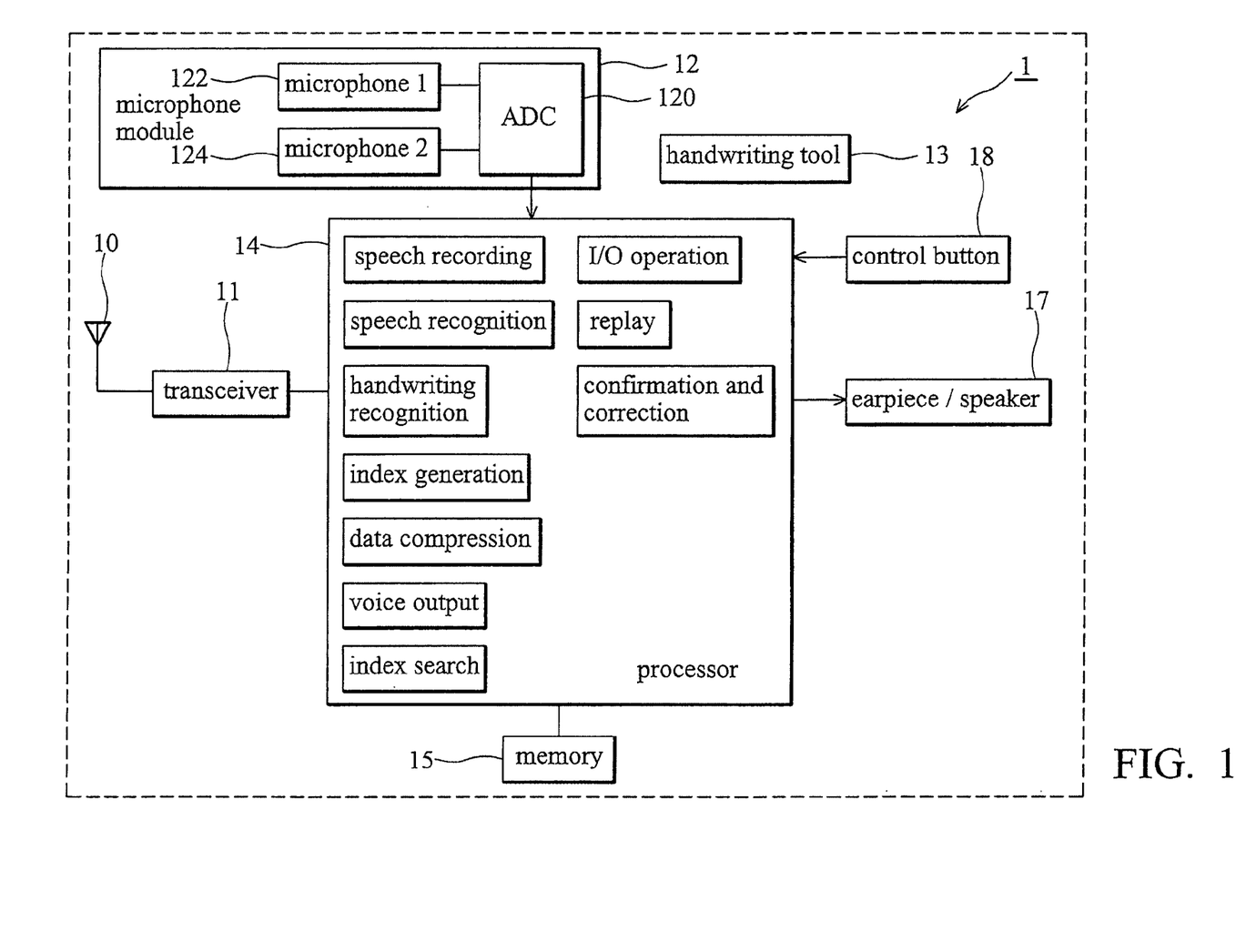
FIG. 1 is a block diagram of an exemplary pen-type voice computer according to the invention.

FIG. 1 is a block diagram of an exemplary pen-type voice computer according to the invention, comprises antenna 10, transceiver 11, microphone module 12, handwriting input 13, processor 14, memory 15, battery 16, speaker/earpiece 17, and control button 18. Antenna 10 is coupled to transceiver 11, in conjunction with microphone module 12, handwriting input 13, memory 15, and speaker/earpiece 17, all coupled to processor 14.

Battery 16 couples to all components in pen-type voice computer 1 and supplies all power requirements thereof.

Antenna 10 and transceiver 11 are capable of transferring digital data to and from a remote computer for data storage or post data processes (please provide some examples here). The communication between antenna 10 and the remote computer may be deployed by Bluetooth, wireless LAN, or other radio frequency (RF) technologies, as well as infrared data association (IrDA) technology.

Microphone module 12 may comprise a microphone array of microphone units 122 and 124 and analog to digital converter (ADC) 120. Microphone units 122 and 124 are arranged such that only directional voice signals within certain angle coverage are picked up, thereby eliminating undesirable signal sources outside the angle coverage. ADC 120 receives analog voice signals from microphone units 122 and 124, and converts which to digital data. Handwriting input 13 receives writing signals from the writing tip thereof, and may be realized by a pen or stylus, a touch panel, a mouse, or an optical scanner. For real-time applications, styluses, touch panels, or mice may receive user handwriting input, subsequently detected and recognized by handwriting recognition software applications to generate a binary format, a text format, or any format suitable for data storage and conversion. For offline applications, optical scanners may scan documents or handwriting for recognition in processor 14. The handwriting signals may be alphanumeric characters, graphical shapes or patterns.

Speaker/earpiece 18 receives analog sound signals from processor 14 and transmits the sound signal to the surrounding for the user to listening to.

Memory 16 provides temporary data storage for processor 14, and program codes to be executed in processor 14. Memory 16 is RAM (Random-Access Memory), ROM (Read-Only Memory), cache, or a combination.

Processor 14 may be a digital signal processor (DSP). Processor 14 receives digitized data from microphone module 12 and handwriting input 13, and performs data processes according thereto. The data processes include data recording, speech recognition, handwriting recognition, index generation, data compression, index search, sound signals generation, and I/O operations. Data recording records voice digitized data or handwriting digitized data temporarily for data recognitions. Speech recognition identifies speech words and converts the recognized words to a form suitable for data transmission and storage, including text, binary, or other computer readable formats. Handwriting recognition identifies writing characters or graphical shapes, and likewise, converts which to a form suitable for data transmission and storage in local memory or a remote computer. Index generation marks an index to a piece of digitized data, such that the user may come back later to search the marked data with the known index. The index may be input from microphone module 12 or handwriting input 13, and may be alphanumeric characters, or graphical shapes in the case of handwriting input 13. Data compression compresses digital data and decreases its data size, so that data storage may be accomplished in a more economic manner, and data transmission to the remote computer may be reduced. Index search finds the piece of data marked by a predetermined index in the index generation operations. Sound signals generation receives compressed data from the remote computer, decompresses the data, and converts the data to analog sound waveform recognizable by the user. I/O operations provide input and output data access between pen-type voice computer 1 and external devices.

Control button 18 is capable of receiving user input and identifies a corresponding data process including data recording, speech recognition, handwriting recognition, index generation, data compression, index search, sound signals generation, voice replay, data confirmation and correction. Control button 18 may be a mechanical switch, an electrical switch, an on-screen switch, or a combination.

Figure 2:
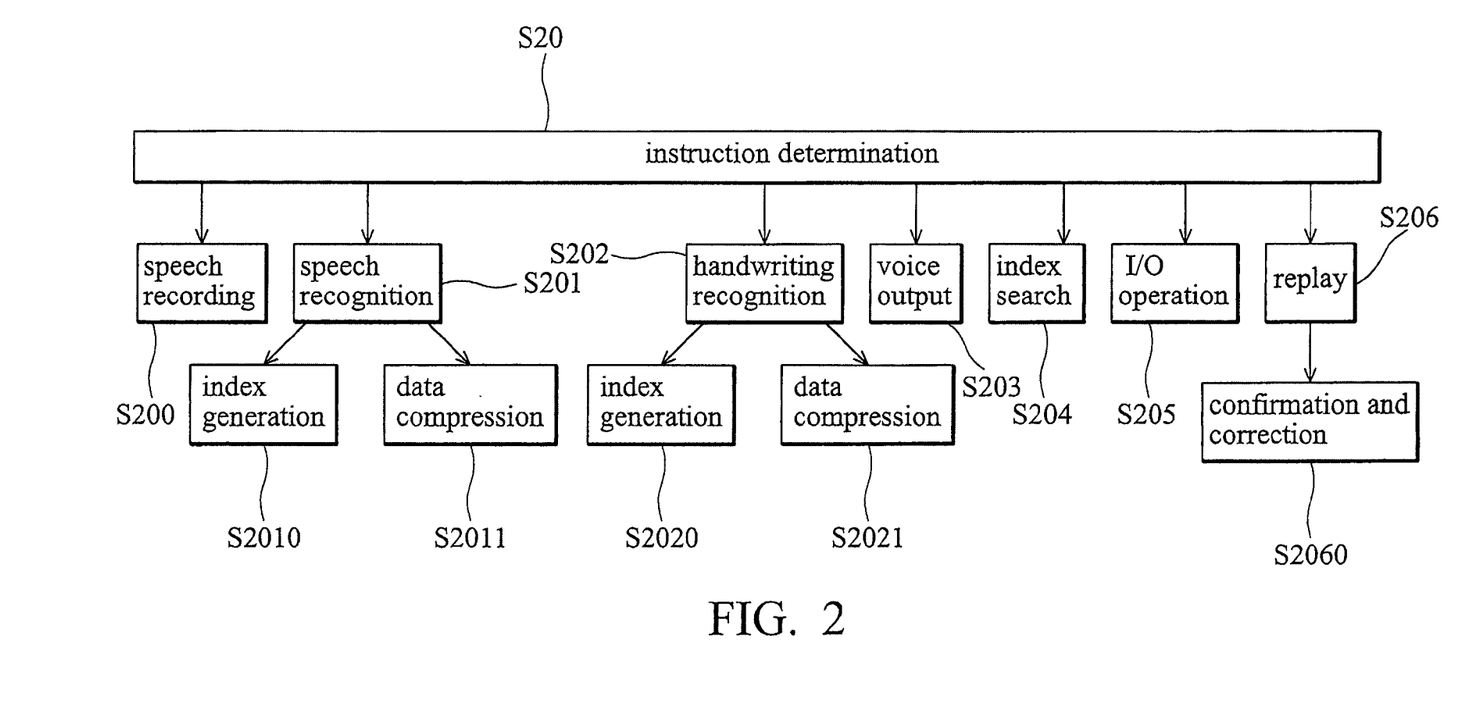
FIG. 2 is an exemplary flow diagram incorporating the pen-type voice computer in FIG. 1.

FIG. 2 is an exemplary flow diagram incorporating the pen-type voice computer in FIG. 1, comprising instruction interpretation S20, data recording S200, speech recognition S201, index generation S2010 data compression S2011, handwriting recognition S202, index generation S2020, data compression S2021, voice output S203, index search S204, I/O operation S205, voice replay S206, data confirmation and correction S2060.

When control button 18 receives inputs to activate a data process, processor 14 interprets and performs corresponding instruction from the input (S20).

Upon recognition of a data recording instruction (S200), processor 14 receives the digitized voice data from ADC 120 or the handwriting signal from handwriting input 13, and stores which in memory 15.

For a speech recognition instruction S201, processor 14 identifies and converts the voice data to binary, text or other formats appropriate for data storage and data compression. Data compression S2011 compresses the converted data to reduce the storage requirement, and stores the compressed data in memory 15, or in a remote computer through transceiver 11 and antenna 10 by wireless transmission. In index generation (S2010), control button 18 is activated to initiate a search index during speech recognition (S201). In an example, while speech recognition (S201) converts the voice data into text data, the hardwiring tool 13 obtains and converts the handwriting signal into the search index linking thereto, such that the search index maps to the text data accordingly. The text data and the search index may be stored in data and search index fields of a lookup table as FIG. 3. The location of the text data may be represented by a start address of the text format data mapped to the search index.

For handwriting recognition S202, processor 14 converts and identifies the handwriting signal to handwriting data in binary, text or other formats appropriate for data storage and data compression. Similarly, data compression S2021 compresses the converted handwriting data to reduce the storage requirement, and stores the compressed data in memory 15, or in a remote computer through transceiver 11 and antenna 10 by wireless transmission. In index generation (S2020), control button 18 is activated to initiate a search index during handwriting recognition (S202). In one example, while handwriting recognition (S202) converts the handwriting signal into text format data, microphone module 12 obtains and converts the voice data into the search index linking thereto, such that the search index maps to the text format data accordingly. The text data and the search index may be stored in a data and a search index fields of a lookup table as FIG. 3. The location of the text data may be represented by a start address of the text format data mapped to the search index.

I/O operation S205 performs input and output operations to communicate between pen-type voice computer and a remote computer.

For index search S204, control button 18 is activated to initialize an index search. A search index may be the voice data from microphone module 12, or handwriting data from handwriting tool 13. In one example, the search index is the voice data, processor 14 loads the lookup table containing the text format data and the search index fields in memory 15, searches the search index in the search index field, and maps and outputs the corresponding text format data as a search result. In another example, microphone module 12 receives a voice index data, processor 14 converts the voice index data into text format as the search index, loads partial or entire text data to be searched in memory 15, and searches the search index therein as the search result. In yet another example, handwriting tool 13 receives a handwriting index data, processor 14 converts the handwriting index data into text format as the search index, loads partial or entire text data to be searched in memory 15, and searches the search index therein as the search result. Processor 14 subsequently converts the search result to an analog voice signal by voice output operation S203, so that speaker/earpiece 17 can play the voice signal and the user can confirm or correct the search result accordingly. The user may skip the search result by controlling button 18, and perform the next search in the remaining data in memory 15 using the search index, until finding a desirable search result.

In voice replay S206, control button 18 indicates the user desires to play particular data stored in the remote computer or memory 15. In one example, processor 14 decompresses and converts the compressed data in the remote computer or memory 15 to a voice signal to be played by speaker/earpiece 17, so that the user can confirm or correct the data accordingly.

In data confirmation and correction S2060, the user controls control button 18 to indicate the playing result from voice replay S206 or the search result from index search S204 is correct or not. If the playing result or the search result is incorrect, the user may operate control button 18 to correct it.

Figure 3:
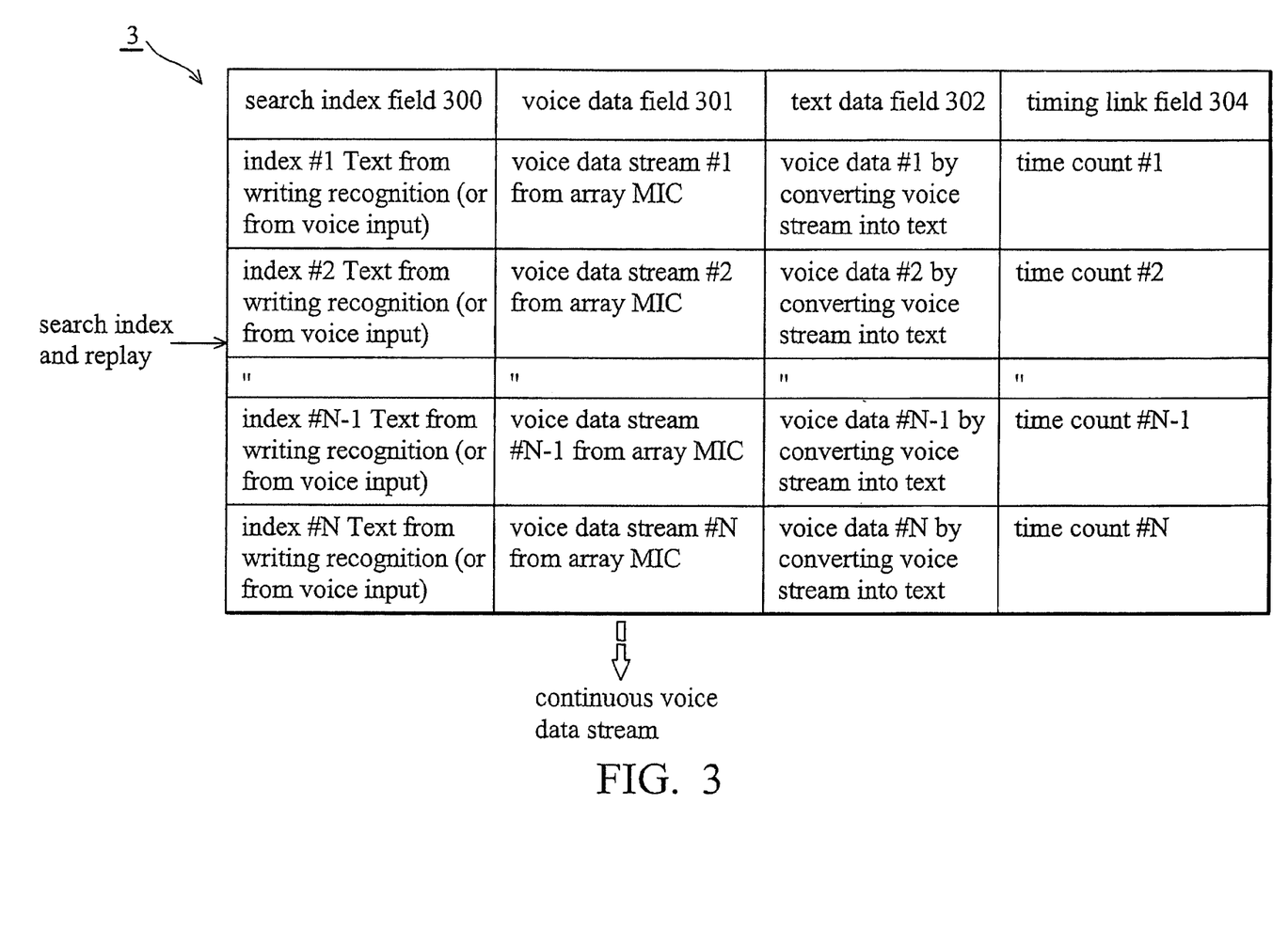
FIG. 3 is a lookup table incorporated in the pen-type voice computer in FIG. 1 and the flow diagram in FIG. 2.

FIG. 3 is a lookup table incorporated in the pen-type voice computer in FIG. 1 and the flow diagram in FIG. 2, comprising search index field 300, voice data field 301, text data field 302, and timing link field 304. Search index field 300 comprises the search index generated in index generation S2010 or index generation S2020. The search index may be the voice data, the handwriting data, or the text data converted there-from. Voice data field 301 comprises a start address of the voice data corresponding to the search index. Text data field 302 comprises a start address of the text data corresponding to the search index. Timing linking field 304 comprises a time count corresponding to a recording time of the data. During index search S204 or replay S206, processor 14 searches search index field 300 using a desirable search index, and find the desirable search index in index search field, looks up the corresponding voice data field 301, text data field 302, or timing link field 304, converts the data associated with the start address or the time count into a voice signal, and plays the voice signal through speaker/earpiece 17 in voice output S203, so that the user can confirm the accuracy of the data. In an embodiment, a single search index can correspond to multiple voice data, text data, or time counts, and the user can skip the current index search S204, and conduct the next using identical search index by controlling control button 18. Processor 14 then searches for another search index in search index field 300, converts and plays the corresponding voice data, text data, or data associated with the time count.

Figure 4B:
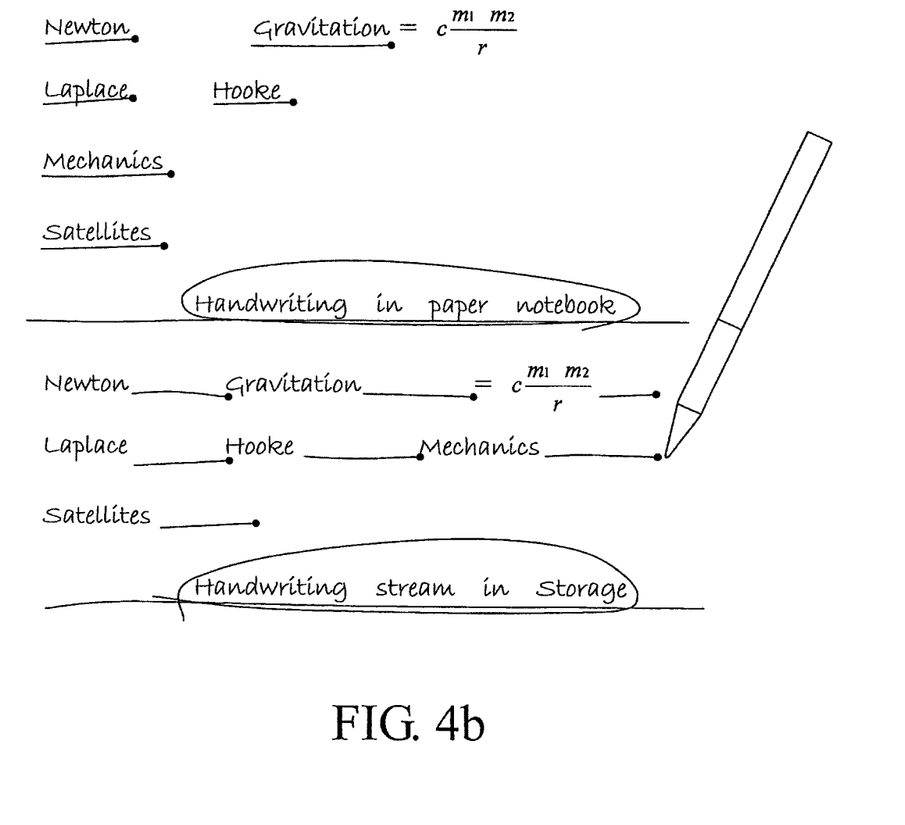

FIGS. 4a and 4b illustrate an exemplary method of index generation, incorporating the pen-type voice computer in FIG. 1, the flow diagram in FIG. 2, and the lookup table in FIG. 3, employing FIG. 4a for recording a voice stream by speech recording S200, and FIG. 4b for handwriting input by handwriting recognition S202 and index generation S2020.

During speech recording S200, processor 14 receives the speech in FIG. 4a from microphone module 12, the user activates the index generation S2020 by controlling control button 18 and scratching some words or graphical patterns down on a piece of paper, as FIG. 4b. Referring to FIG. 4b, the user underlines the word "Newton" with a dot at the end indicates "Newton" is a search index, processor 14 searches backwards in memory 15 for the data matching the search index "Newton" and records "Newton" in search index field 300, and start address of the matched data in text data field 302. Similarly, the underlines with a dot to words "gravitation", "Laplace", "Hooke", "mechanics", and "satellites" creates corresponding search indexes and data in search index field 300 and text data field 302. In another example, the user circles the text stream "handwriting in paper notebook" on the paper, processor 14 recognizes the circle as a timing link, records the time count of the circling action in timing link field 304, and the text stream "handwriting in paper notebook" in index search 300.

During index search operation S204, the user uses "Newton" "gravitation", "Laplace", "Hooke", "mechanics", or "satellites" to search the index table, processor 14 searches search index field 300 and returns the corresponding data in text data field 302. The user may also uses a key word "handwriting in paper notebook" to search the index table, processor 14 searches search index field 300, returns a time count in timing link field 304, and plays the data in memory 15 at the time count that speaker/earpiece 17, so that the user can verify the accuracy of the data.

Referring back to FIG. 4a, in another example, the user wishes to conduct multiple index search S204 or replay S206. Handwriting tool 13 receives an input "Newton" as the desirable search index from the user, processor 14 searches search index field 300, find the first search index (corresponding to "Newton conceived that . . . ") matching the desirable index, converts and plays the data accordingly for the user to verify the accuracy, if the user determine the data is incorrect, he or she can skip the current index search and conduct the next by controlling control button 18, processor 14 then searches search index field 300, find the second search index (corresponding to "Newton, though he . . . "), converts and plays the data accordingly for the user to verify the accuracy, the skip and search process may be conducted multiple times, until a satisfactory data is found.

Figure 5:
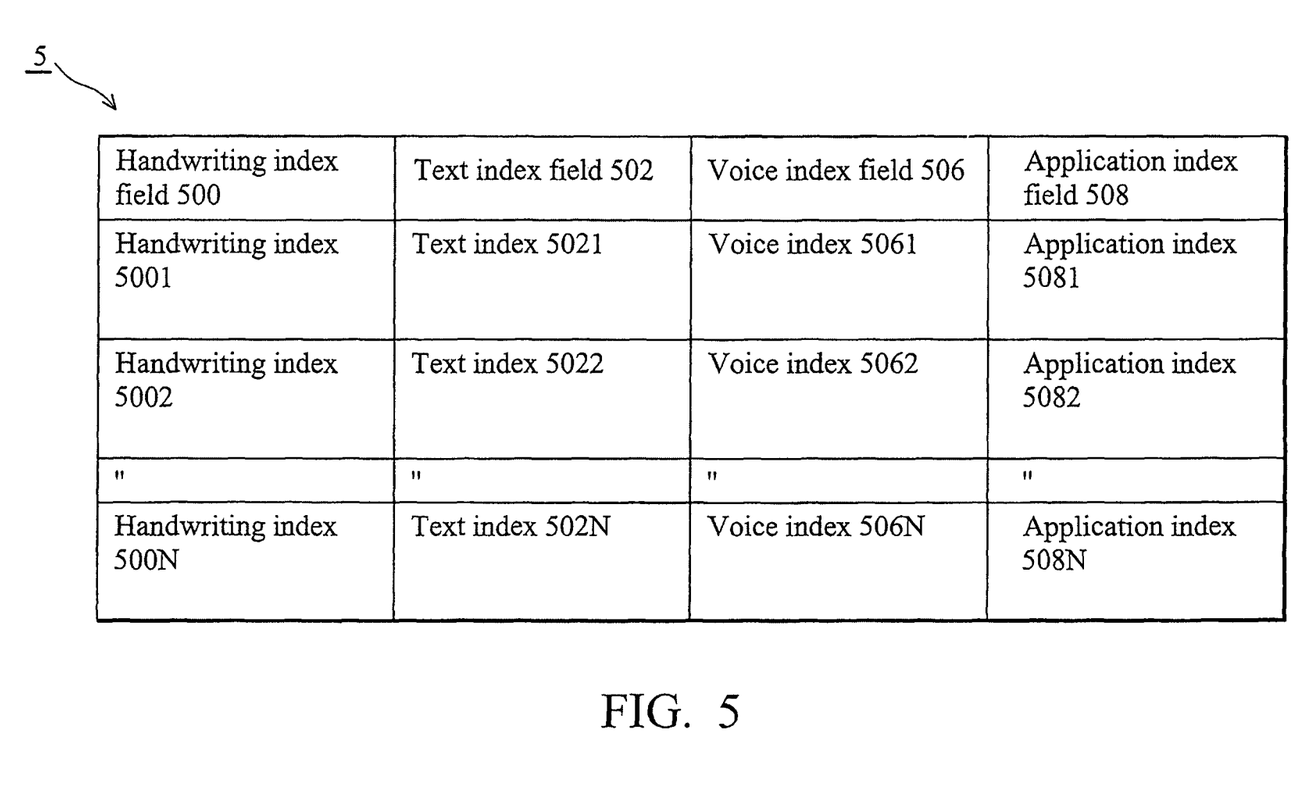
FIG. 5 is another exemplary lookup table incorporated in the pen-type voice computer in FIG. 1 and the flow diagram in FIG. 2.

FIG. 5 is another exemplary lookup table incorporated in the pen-type voice computer in FIG. 1 and the flow diagram in FIG. 2, comprising handwriting index field 500, text index field 502, voice index field 506, and application filed 508. Handwriting index field 500 stores the handwriting signal from handwriting tool 13, acting as the search index. Text index field 502 contains the handwriting text data, also acting as the search index. Voice index field 506 includes the voice data, as the search index. Application filed 508 include a time, a program instruction, or a phone number corresponding to the search index from handwriting index field 500, text index field 502, or voice index field 506.

The user records a speech file through microphone module 12 while taking notes on a writing surface using handwriting tool 13, controls control button 18 for generating index 5001 in handwriting index field 500. Processor 14 receives and records the handwriting signal as generating handwriting index 5001, converts the handwriting signal to handwriting data in a text format, and records the handwriting data as text index 5021, and generating handwriting index 5001. In an example, application field 508 holds time index 5081 corresponding to generating handwriting index 5001, such that the user may find time index 5081 by searching handwriting index 5001 or text index field 5021. The user may also generate voice index 5061 corresponding to handwriting index 5001 or text index 5021, to provide as an alternative searching index, such that the user may find time index 5081 by speaking voice index 5061 to microphone module 12. A voice index may be generated by inputting a handwriting index or text index from handwriting tool 13, playing a the content of the speech file at the time index corresponding thereto, controlling control button 18 indicating a voice index generation, recording a voice stream from microphone module 12, and conforming the completion of voice index generation. Voice index 5061 may be relevant or irrelevant to the pronunciation of handwriting index 5001 or text index 5021. The application indexes in application field 508 correspond to a handwriting index, a text index, or a voice index. Application index 5081 may be a program instruction controlling devices internal or external to pen-type voice computer 1, processor 14 receives and searches the search index in handwriting index field 500, text index field 502, voice index field 506, and finds and executes the corresponding application index. Application index 5081 may also be a phone number entry, processor 14 receives and searches the search index in handwriting index field 500, text index field 502, voice index field 506, and finds a phone number entry corresponding thereto in application field 508.

In one application, the user enters handwriting index 5001 and voice index 5061, both corresponding to a name of a person, and a phone number corresponding thereto as application 5081, thereby creating a phonebook. Since handwriting and voice pronunciation is unique to each person, handwriting index 5001 or voice index 5061 acts as an unique identifier, the phonebook forbids others to user it, resulting in high security and convenience. In another application, the user enters a handwriting command in handwriting index field 500, a voice command in voice index field 506, and a program instruction in application field 508 corresponding thereto, thereby creating a customized command table for high security and convenience.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of generating a voice index table having a handwriting index field, a text index field, a voice index field and an application field in a pen-type voice computer, comprising:
   recording voice data by a microphone, wherein the voice data comprise a plurality of voice segments, each having a corresponding timing index;
   generating voice text data for each voice segment by speech recognition;
   generating a handwriting index of the voice data by inputting drawing data using a handwriting input device and converting the drawing data to the handwriting index using text recognition; and
   associating the handwriting index with the corresponding voice data to generate the voice index table, wherein the associating step comprises associating the timing index of a given voice segment with the handwriting index when the voice text data of the given voice segment matches the handwriting index in content;
   receiving a voice index from an acoustic sensor; and
   associating the voice index with the handwriting index and the corresponding voice data.

2. The method as claimed in claim 1, further comprising: playing voice data according to the handwriting index.

3. The method as claimed in claim 1, further comprising: receiving a second voice index to replace the voice index in the voice index table.

4. The method as claimed in claim 1, wherein the voice index table comprises a handwriting index field, a text index field, a voice index field and an application field.

5. A pen-type computer, generating a voice index table having a handwriting index field, a text index field, a voice index field and an application field, comprising:
   a microphone, recording voice data, wherein the voice data comprise a plurality of voice segments, each having a corresponding timing index;
   means for generating voice text data for each voice segment by speech recognition;
   means for generating a handwriting index of the voice data by inputting drawing data using a handwriting input device and converting the drawing data to the handwriting index using text recognition; and
   means for associating the handwriting index with the corresponding voice data to generate the voice index table, wherein the associating step comprises associating the timing index of a given voice segment with the handwriting index when the voice text data of the given voice segment matches the handwriting index in content;
   means for receiving a voice index from an acoustic sensor; and
   means for associating the voice index with the handwriting index and the corresponding voice data.

6. The pen-type computer in claim 5, further comprising: means for playing voice data according to the handwriting index.

7. The pen-type computer in claim 5, further comprising: means for receiving a second voice index to replace the voice index in the voice index table.

8. The pen-type computer as claimed in claim 5, wherein the voice index table comprises a handwriting index field, a text index field, a voice index field and an application field.

* * * * *